United States Patent
Heshmati et al.

(10) Patent No.: US 11,747,362 B2
(45) Date of Patent: Sep. 5, 2023

(54) METHOD AND SYSTEM FOR DETERMINING VIBRATIONS GENERATED BY A DEVICE

(71) Applicant: TDK CORPORATION, Tokyo (JP)

(72) Inventors: Ardalan Heshmati, Saratoga, CA (US); Mahdi Heydari, Stanford, CA (US); Jibran Ahmed, Calgary (CA)

(73) Assignee: TDK CORPORATION

( * ) Notice: Subject to any disclaimer, the term of this patent is extended or adjusted under 35 U.S.C. 154(b) by 0 days.

(21) Appl. No.: 17/556,789

(22) Filed: Dec. 20, 2021

(65) Prior Publication Data
US 2022/0196698 A1 Jun. 23, 2022

Related U.S. Application Data

(60) Provisional application No. 63/128,529, filed on Dec. 21, 2020.

(51) Int. Cl.
*G01P 15/097* (2006.01)
*G01P 15/08* (2006.01)
(Continued)

(52) U.S. Cl.
CPC .......... *G01P 15/097* (2013.01); *G01H 1/00* (2013.01); *G01M 13/00* (2013.01); *G01M 13/028* (2013.01); *G01P 15/0891* (2013.01)

(58) Field of Classification Search
None
See application file for complete search history.

(56) References Cited

U.S. PATENT DOCUMENTS

| 4,480,480 A * | 11/1984 | Scott .................. G01M 5/0033 702/41 |
| 5,686,669 A | 11/1997 | Hernandez et al. |

(Continued)

OTHER PUBLICATIONS

Agrawal, et al., "Analysis of the condition based monitoring system for heavy industrial machineries", 2013 IEEE International Conference on Computational Intelligence and Computing Research, 2013, 1-4.

(Continued)

*Primary Examiner* — Raul J Rios Russo
*Assistant Examiner* — Carl F. R. Tchatchouang

(57) ABSTRACT

In a method for determining vibrations generated by a device, first vibration measurements are received from a first accelerometer coupled to the device, the first vibration measurements comprising a first device vibration contribution and a first environmental vibration contribution, wherein the device is located within an environment comprising a plurality of devices capable of generating vibrations. Second vibration measurements are received from a second accelerometer located within the environment and not connected to the device, the second vibration measurements comprising a second device vibration contribution and a second environmental vibration contribution. The first vibration measurements and the second vibration measurements are compared. Based on the comparing, the first device vibration contribution is estimated. An operational condition of the device is determined based on the estimating, wherein the operational condition is indicative of device performance that may be impacted by device vibration contributions.

20 Claims, 7 Drawing Sheets

(51) Int. Cl.
G01H 1/00      (2006.01)
G01M 13/00     (2019.01)
G01M 13/028    (2019.01)

(56) References Cited

U.S. PATENT DOCUMENTS

| | | | |
|---|---|---|---|
| 6,321,602 B1 | 11/2001 | Ben-Romdhane | |
| 6,915,235 B2 | 7/2005 | Reeves et al. | |
| 10,254,270 B2* | 4/2019 | Potyrailo | G01N 33/2888 |
| 10,983,097 B2 | 4/2021 | Yoskovitz et al. | |
| 11,054,301 B2 | 7/2021 | Hedin | |
| 11,054,337 B2 | 7/2021 | Knaup | |
| 2015/0355216 A1* | 12/2015 | Girardeau | G01H 11/08 |
| | | | 73/514.29 |
| 2016/0003708 A1* | 1/2016 | D'Orlando | G01M 13/00 |
| | | | 702/34 |
| 2016/0207552 A1* | 7/2016 | Mian | B61L 15/0072 |
| 2020/0284694 A1 | 9/2020 | Scott et al. | |
| 2022/0094253 A1* | 3/2022 | Houston | H02K 7/003 |

OTHER PUBLICATIONS

Barksdale, et al., "Condition Monitoring of Electrical Machines with Internet of Things", SoutheastCon 2018, 2018, 1-4.

Chikuruwo, et al., "Design of an automated vibration monitoring system for condition based maintenance of a lathe machine (Case study)", 2016 International Conference on System Reliability and Science (ICSRS), 2016, 60-63.

* cited by examiner

METHOD AND SYSTEM FOR DETERMINING VIBRATIONS GENERATED BY A DEVICE

RELATED APPLICATION

This application claims priority to and the benefit of U.S. Provisional Patent Application 63/128,529, filed on Dec. 21, 2020, entitled "DIFFERENTIAL VIBRATION SENSING," by Heshmati, et al., and assigned to the assignee of the present application, which is incorporated herein by reference in its entirety.

BACKGROUND

Condition-Based Monitoring (CBM) is a practice for maintaining various types of equipment and assets by monitoring aspects of the equipment and assets using sensors. The sensors are used to monitor various parameters indicative of the operational condition of the equipment or asset. The sensed parameters are analyzed with the intention of identifying early performance degradation of the asset, with the intention of repairing the asset prior to failure or significant performance degradation, thereby reducing equipment downtime.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DESCRIPTION OF EMBODIMENTS

Figure 1:
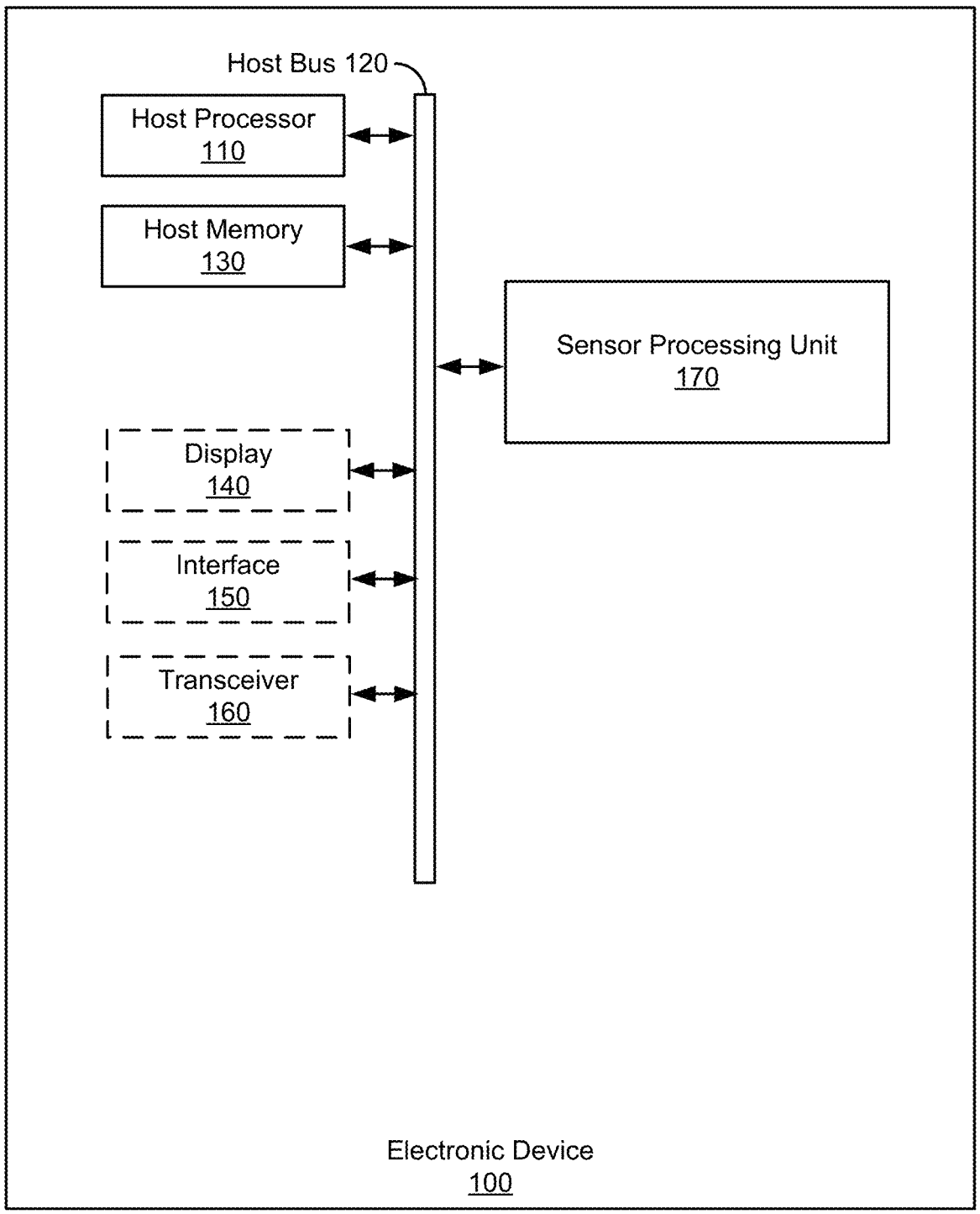
FIG. 1 is a block diagram of an example electronic device upon which embodiments described herein may be implemented.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "comparing," "monitoring," "calibrating," "estimating," "initiating," "providing," "receiving," "controlling," "transmitting," "isolating," "generating," "aligning," "synchronizing," "identifying," "maintaining," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

Overview of Discussion

Discussion begins with a description of an example electronic device including a motion sensor, upon which described embodiments can be implemented. An example system for determining vibrations generated by a device is then described, in accordance with various embodiments. Example operations for operating a system for determining vibrations generated by a device using motion sensors are then described.

Condition-Based Monitoring (CBM) is a practice for maintaining various types of equipment and assets by monitoring aspects of the equipment and assets using sensors. The sensors are used to monitor various parameters indicative of the operational condition of the equipment or asset. The sensed parameters are analyzed with the intention of identifying early performance degradation of the asset, with the intention of repairing the asset prior to failure or significant performance degradation, thereby reducing equipment downtime.

In some environments, (e.g., factories and manufacturing facilities), there may be many sources of vibration (stationary, steady-state, or transient) that propagate through the space and are picked up by sensors on device being monitored, making it more difficult to attribute vibrations sensed by the sensor to the device being monitored rather than the surrounding environment. For example, multiple pieces of equipment in a factory floor with insufficient vibration dampening may cause vibrations not caused by a piece of equipment to be sensed by a sensor monitoring the piece of equipment. Furthermore, transient events, may further complicate the sensing of vibrations at a piece of equipment. For example, a forklift traveling by the piece of equipment, other equipment being turned on or off, and certain equipment with a variable vibration signature, can impact the sensed vibration at a motion sensor monitoring a piece of equipment.

Embodiments described herein describe systems and methods for determining vibrations generated by a device. First vibration measurements are received from a first accelerometer (or other motion sensor) coupled to the device, the first vibration measurements comprising a first device vibration contribution and a first environmental vibration contribution, wherein the device is located within an environment comprising a plurality of devices capable of generating vibrations. Second vibration measurements are received from a second accelerometer (or other motion sensor) located within the environment and not directly connected to the device, the second vibration measurements comprising a second device vibration contribution and a second environmental vibration contribution. The first vibration measurements and the second vibration measurements are compared. Based on the comparing, the first device vibration contribution is estimated. An operational condition of the device is determined based on the estimating, wherein the operational condition is indicative of device performance that may be impacted by device vibration contributions.

In accordance with the described embodiments, a motion sensing device, such as an accelerometer, is placed on or connected to an element of interest and another motion sensing device is placed nearby in the environment but not on the element of interest. For example, a motion sensor can be placed on a motor being monitored and a second motion sensor can be placed on the ground near the motor. In another example, a motion sensor can be placed on a segment of a moving robotic arm and a second motion sensor can be placed on the stationary body of the same robotic arm (e.g., the base). The motion sensors measure the vibrations from the element, device, or machinery being monitored and somewhere nearby or proximate the element being monitored as environmental reference. The described embodiments use differential vibration sensing to determine the vibrations of the element of interest, without any influence from any surrounding/environmental vibrations, by removing the vibrations not caused by the element of interest.

The described embodiments distinguish vibration from the element of interest from the vibrations coming from the surrounding environment. In one embodiment, the vibration is distinguished by determining which of the vibrations (e.g., at a certain frequency) is higher. For instance, a vibration component would be considered to be from the element of interest if the vibration amplitude is higher for the motion sensor connected to the element of interest rather than the sensor monitoring the environment. In some embodiments, a first amplitude of the first vibration measurements at a particular frequency and a second amplitude of the second vibration measurements at the particular frequency are determined. The first amplitude at the particular frequency is compared to the second amplitude at the particular frequency. Estimating the first device contribution can include determining which of the first amplitude and the second amplitude is greater, and provided the first amplitude is greater than the second amplitude, determining that the device is generating vibrations.

In another embodiment, the vibration generated by the element of interest is quantitatively determined and isolated from all vibrations. Vibrations measured at the elements itself and at the reference position both measure vibrations from the element and from the environment. In some embodiments, the first device vibration contribution is determined using the first vibration measurements, the second vibration measurements, and a plurality of sensing coefficients for the first motion sensor (e.g., accelerometer) and the second motion sensor (e.g., accelerometer). In accordance with some embodiments, a plurality of sensing coefficients for the first motion sensor and the second motion sensor by receiving measurements from the first motion sensor and the second motion sensor under two conditions: 1) receiving first calibration measurements from the first motion sensor and the second motion sensor while the device is not operational and only the environment is contributing vibrations, and 2) receiving second calibration measurements from the first motion sensor and the second motion sensor while the device operates and the environment contributes same vibrations as the first calibration measurements.

In some embodiments, the first device vibration contribution is isolated from the first vibration measurements and the second vibration measurements, wherein the first device vibration contribution includes a first sensing coefficient multiplied by the actual device vibration contribution, the first environmental vibration contribution includes a second sensing coefficient multiplied by the actual environmental vibration contribution, the second device vibration contribution includes a third sensing coefficient multiplied by the actual device vibration contribution, and the second environmental vibration contribution includes a fourth sensing coefficient multiplied by the actual environmental vibration contribution. In some embodiments, the operational condition of the device is determined using the first device vibration contribution.

Example Electronic Motion Sensing Device

Turning now to the figures, FIG. 1 is a block diagram of an example electronic device 100. As will be appreciated, electronic device 100 may be implemented as a device or apparatus, such as an electronic motion sensing device. For example, such an electronic device may be, without limitation, a vibration sensing device that can be coupled to or affixed to equipment or assets in a factory or manufacturing plant.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged. In other embodiments, electronic device 100 may only include sensor processing unit 170, where sensor processing unit 170 includes componentry capable of transmitting data (e.g., motion sensing data) to other electronic devices or computer systems.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user. It should be appreciated that display 140 is optional, as various electronic devices may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Figure 2:
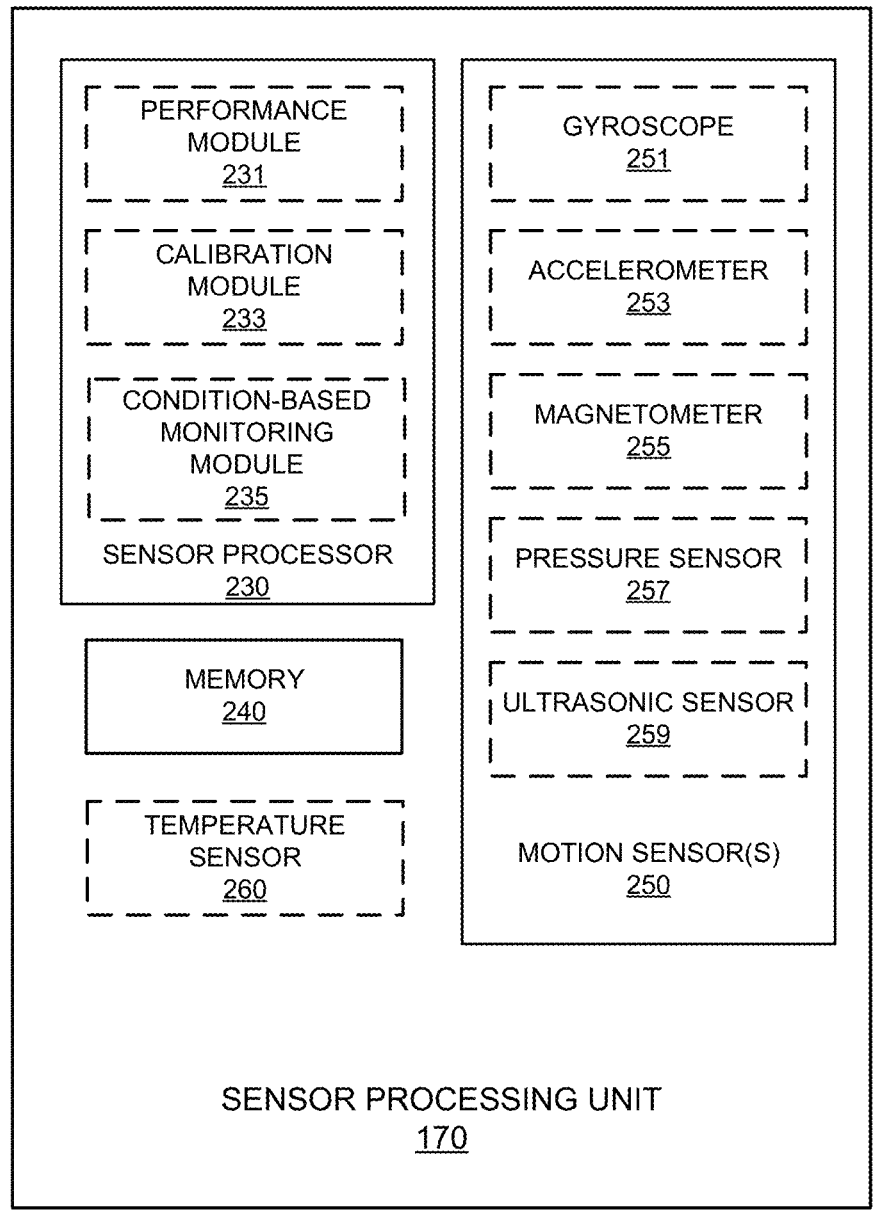
FIG. 2 is a block diagram of an example sensor processing unit, according to some embodiments.

FIG. 2 shows a block diagram of an example sensor processing unit 170, in accordance with various aspects of the present disclosure. SPU 170 comprises: a sensor processor 230; internal memory 240; and one or more sensors. With respect to SPU 170, components showed in broken line (i.e., dashed boxes) may not be included in some embodiments. Accordingly, in some embodiments, electronic device 100 may additionally include one or some combination of: motion sensors 250 (e.g., gyroscope 251, accelerometer 253, a magnetometer 255, and/or other motion sensors such as a pressure sensor 257 and/or an ultrasonic sensor 259); temperature sensor 260; and/or other sensors (e.g., a biometric sensor). In various embodiments, SPU 170 or a portion thereof, such as sensor processor 230, is communicatively coupled with application host processor 110, host memory 130, and other components of electronic device 100 through interface 150 or other well-known means. SPU 170 may also comprise a communications interface (not shown) similar to interface 150 and used for communications among one or more components within SPU 170.

Sensor processor 230 can be one or more microprocessors, CPUs, DSPs, GPUs, general purpose microprocessors, ASICs, ASIPs, FPGAs or other processors that run software programs, which may be stored in memory such as internal memory 240 (or elsewhere), associated with the functions of sensor processing unit (SPU) 170. Sensor processor 230 operates to control and configure included sensors such as motion sensor(s) 250 and/or temperature sensor 260. Sensor processor 230 may also run software programs for electronic device 100, and/or for other applications related to the functionality of an electronic device 100. In some embodiments, sensor processor 230 includes one or more of a performance module 231 and a calibration module 233. These modules, when included, may be implemented in logic or in firmware, software, or a combination thereof that executes instructions upon sensor processor 230. When not included, sensor processor 230 may simply perform the functions described herein with respect to performance module 231 and calibration module 233. It should be appreciated that in some embodiments, the functions described as being performed by sensor processor 230 may also or alternatively be performed by host processor 110 or another communicatively coupled processor.

Performance module 231 may operate to monitor and/or set the performance specifications of the various sensors. For example, sensor processor 230 or a portion thereof, such as performance module 231, may set the output data rate and full-scale data rate for the sensors. Performance module 231 may also monitor the performance of sensors that are internal and external to SPU 170 to make sure that the sensors are performing as required or as specified. It should be appreciated that performance module 231 may be external to SPU 170 (e.g., operated at a remote computer system such as control system 350).

Calibration module 233 may operate to coordinate and perform calibration of a sensor in conjunction with another sensor. Embodiments described herein provide a plurality of motion sensors, one connected to or coupled to an asset being measured and one placed near the asset within the same environment, operating in conjunction for use in determining the true vibration contributions of an asset connected to or coupled to one of the motion sensors (e.g., sensor 312 of FIG. 3). During calibration, measurements are made at both sensors under two conditions: 1) where the asset is not operating (or does not generate vibration at frequency f) and only environment has vibration at frequency f; and 2) the element operates and has vibration at frequency f with the same environment condition as the first condition. In various embodiments, SPU 170 and/or the asset can control the asset to perform the calibration (e.g., control operation of the asset), or can perform calibration opportunistically when it is determined that the asset is not operating (e.g., sensed by SPU 170). It should be appreciated that calibration module 233 may be external to SPU 170 (e.g., operated at a remote computer system such as control system 350).

In some embodiments, the calibration procedure may comprise calibration module 233 receiving a signal or message from an entity outside of SPU 170 to indicate that calibration is needed. When calibration is performed, sensor processor 230, or a portion thereof such as calibration module 233, may send a signal to one or more sensors to place the sensor(s) in a calibration mode and may also signal the sensor(s) about a window of time when a calibration measurement should be taken. It should be appreciated that in some embodiments, some, or all functions of calibration module 233 may be carried out by host processor 110 or by any processor disposed within electronic system 100.

Condition-based monitoring (CBM) module 235 may operate to performance condition-based monitoring in conjunction with one or more SPUs 170. For example, CBM module 235 can receive sensed motion data from the SPU 170 in which it is located and another SPU 170, where one SPU 170 is located on a device within an environment and the other SPU 170 is located within the environment but not directly connected to the device. An operational condition of the device can be determined by using the motion data received from the two SPUs 170, where the operational condition is indicative of device performance that may be impacted by device vibration contributions.

Internal memory 240 can be any suitable type of memory, including but not limited to electronic memory (e.g., read only memory (ROM), random-access memory (RAM), or other electronic memory). Internal memory 240 may store algorithms, routines, or other instructions for instructing sensor processor 230 on the processing of data output by one or more of the motion sensors 250. In some embodiments, internal memory 240 may store calibration instructions for one or more motion sensors 250. In some embodiments, memory 240 may store instructions for implementing one or both of performance module 231 and calibration module 233.

Motion sensors 250, when included, may be implemented as MEMS-based motion sensors, including inertial sensors such as a gyroscope 251, or accelerometer 253, or an electromagnetic sensor such as a Hall effect or Lorentz field magnetometer 255 (or some combination thereof). Other inertial sensors, such as an inclinometer may also be included. A pressure sensor 257 may also be included and used as a (vertical) motion sensor. In some embodiments, at least a portion of the motion sensors 250 may also, for example, be based on sensor technology other than MEMS technology (e.g., CMOS technology, etc.). One or more of the motion sensors 250 may be configured to provide raw data output measured along three orthogonal axes or any equivalent structure. Motion sensor(s) 250 are communicatively coupled with sensor processor 230 by a communications interface, bus, or other well-known communication means. When a version of electronic device 100 includes one or more motion sensors 250 and is affixed to, coupled with, or placed near to machinery or equipment, the motion (e.g., vibration) and/or orientation in space of the electronic device 100 are sensed by the motion sensor(s) 250 when the electronic device 100 is moved in space by the machinery or senses vibrations. In some embodiments, one of more of motion sensors 250 include a calibration mode that can be initiated by sensor processor 230. In some embodiments, one or more of motion sensors 250 can determine when an out-of-calibration state exists and is/are configured to send a signal to sensor processor 230 or elsewhere to request calibration. The sensor may also send the calibration signal for other reasons other than an out of calibration state, such as surpassing a threshold of cycles or time since last calibration. This signal is referred to herein as a "calibrate me" signal or a "calibration signal," and identifies a need for calibration of the sensor which sends it. In some embodiments, sensors that do not have the ability to self-determine when calibration is needed are monitored by sensor processor 230, performance module 231, calibration module 233, and/or another external entity to determine when calibration is required.

As discussed herein, various aspects of this disclosure may, for example, comprise processing various sensor signals indicative of device motion and/or orientation. These signals are generally referred to as "motion data" herein. Non-limiting examples of such motion data are signals that indicate accelerometer, gyroscope, and/or magnetometer data in a coordinate system. In other embodiments, the motion data can be vibrations sensed by a microphone. The motion data may refer to the processed or non-processed data from the motion sensor(s). In an example implementation, data from an accelerometer, gyroscope, and/or magnetometer may be combined in a so-called data fusion process, performed, for example, by sensor processor 230, in order to output motion data in the form of a vector indicative of device orientation and/or indicative of a direction of device motion. Such a vector may, for example, initially be expressed in a body (or device) coordinate system. Such a vector may be processed by a transformation function that transforms the orientation vector to a world coordinate system. The motion and/or orientation data may be represented in any suitable reference frame, and may be represented in any suitable form, such as for example, but not limited to, quaternions, orientation matrices, Euler angles, and any of a variety of coordinate systems (e.g., the Unity coordinate system).

In some embodiments, electronic device 100 and/or sensor processing unit 170 may include a temperature sensor 260 or other means for sensing and determining the operating temperature and/or changes in the operating temperature of electronic device 100 and/or sensor processing unit 170. In some embodiments, the motion sensor itself may comprise or be operable as a temperature sensor.

Example System for Determining Vibrations Generated by a Device

In accordance with the described embodiments, a motion sensing device, such as an accelerometer, is placed on or connected to an element of interest (e.g., an asset or a device) and another motion sensing device is placed nearby in the environment but not on the element of interest. The motion sensors measure the vibrations from the element, device, or machinery being monitored and somewhere nearby or proximate the element being monitored as environmental reference. The described embodiments use differential vibration sensing to determine the vibrations of the element of interest, without any influence from any surrounding/environmental vibrations, by removing the vibrations not caused by the element of interest.

Figure 3:
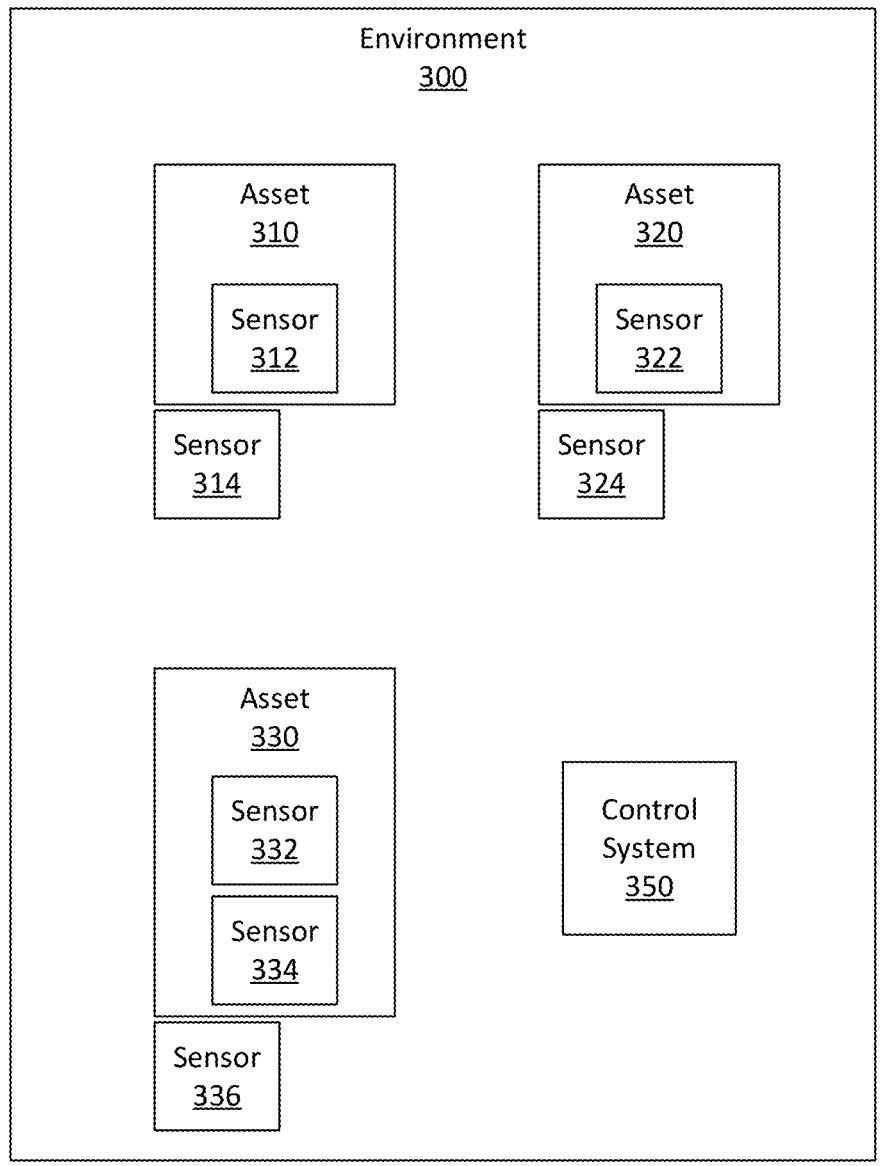
FIG. 3 is a block diagram of an example environment including assets and motion sensors, according to embodiments.

FIG. 3 is a block diagram of an example environment 300 including assets and motion sensors, according to embodiments. As described herein, an environment 300 describes a location that includes a plurality of sources of vibration. Without limitation, an environment 300 can be a factory, a manufacturing facilities, a food processing plant, a power station, a shipyard, a distribution facility, etc. In general, environment 300 can be any space in which multiple assets are generating vibrations are located.

As illustrated, example environment 300 includes assets 310, 320, and 330 having one or more associated motion sensors and control system 350. As described herein, assets (also referred to herein as equipment) can include, without limitation, pumps, engines, motors, appliances, conveyer belts, robotic arms, etc. In general, assets include any device or machine that generates vibrations upon degradation of performance. It should be appreciated that environment 300 can include any number of assets, of which the illustrated example is one embodiment. Within environment 300, there are multiple sources of vibration (stationary, steady-state, or transient), including assets 310, 320, and 330, as well as other possible sources (e.g., forklifts, supply trucks, equipment being turned on or off, etc.)

Motion sensor 312 is coupled to or connected to asset 310, and is configured to sense motion generated by asset 310. It should be appreciated that motion sensor 312 is also capable of sensing motion generated within environment 300 due to the placement of asset 310 within environment 300, dependent on the amplitude and frequency of such motion (e.g., distance from motion sensor 312). Motion sensor 314 is positioned within environment 300 and is proximate asset 310, but not directly connected or affixed to asset 310. For example, motion sensor 314 may be located on the ground of environment 300 proximate asset 310, or may be placed on a stationary element of asset 310 (e.g., a stationary body of a robotic arm). It should be appreciated that the sensed data may be raw vibration sensing data, set of features derived from the data, or events detected.

Motion sensor 322 is coupled to or connected to asset 320, and is configured to sense motion generated by asset 320. It should be appreciated that motion sensor 322 is also capable of sensing motion generated within environment 300, dependent on the amplitude and frequency of such motion (e.g., distance from motion sensor 322). Motion sensor 324 is positioned within environment 300 and is proximate asset 320, but not connected or affixed to asset 320.

Motion sensors 332 and 334 are coupled to or connected to asset 330, and is configured to sense motion generated by asset 330. It should be appreciated that motion sensors 332 and 334 can be coupled or connected to different elements of assets 330 (e.g., different arm segments of a robotic arm or different positions of a motor). It should be appreciated that motion sensors 332 and 334 are also capable of sensing motion generated within environment 300, dependent on the amplitude and frequency of such motion (e.g., distance from motion sensors 332 and 334). Motion sensor 336 is positioned within environment 300 and is proximate asset 330, but not connected or affixed to asset 330.

Control system 350 is a computer system configured to receive the motion sensing data from motion sensors of environment 300, and to use differential vibration sensing to determine the vibrations of the assets 310, 320, and 330, respectively, without any influence from any surrounding/environmental vibrations, by removing the vibrations not caused by the asset being sensed. It should be appreciated that the motion sensors of environment 300 can be connected to control system 350 via wired and/or wireless connections. It should be appreciated that control system 350 is optional in various embodiments. For example, the functionality of control system 350 may be performed by a CBM module (e.g., CBM module 235 of an SPU 170) located within a motion sensor of environment 300. It should further be appreciated that the condition-based monitoring can be performed by control system 350 in conjunction with a CBM module of a motion sensor of environment 300.

It should be appreciated that, in accordance with various embodiments, the vibrations from the sensors are time synchronized to enable correlating appropriate measurements from the multiple sensors over a sequence of time. Synchronization can be done in the time domain or in the frequency domain. In some embodiments, time synchronization between the sensors can be performed at the system level using wired and/or wireless time synchronization and time keeping techniques.

In other embodiments, the described system allows for the self-synchronization in time measurements from two vibration sensors. For example, the sequence of vibration measurements can be compared between the two sensors. A common vibration characteristic or signature is detected in the data from both sensors that is used to synchronize time based from the two sensors and their data sequence. Use of the sequence of measurements over time to estimate drift between the two devices can be applied to measurement sequence to synchronize the data. There may be a lag between the sensors to measure a specific vibration. For example, vibration moves fast with different speed at different mediums and creating a phase lag between two sensor measurements that is resolved by performing the described self-synchronization.

In some embodiments, to deliver system level power efficiency, the reference vibration sensors may be held in low power standby when an element being monitored is not in use. For example, this can be done by the control system 350 knowing when an asset is on or off, or by the vibration sensor on an element being monitored detecting the equipment being on or off by analyzing the sensed vibrations present when equipment is on. In another example, two motion sensors in a self-contained CBM system (e.g., without an external control system 350) can control each other for purposes of power mode control. The control system can send wake up/sleep commands through either a wired or wireless connection.

Figure 4:
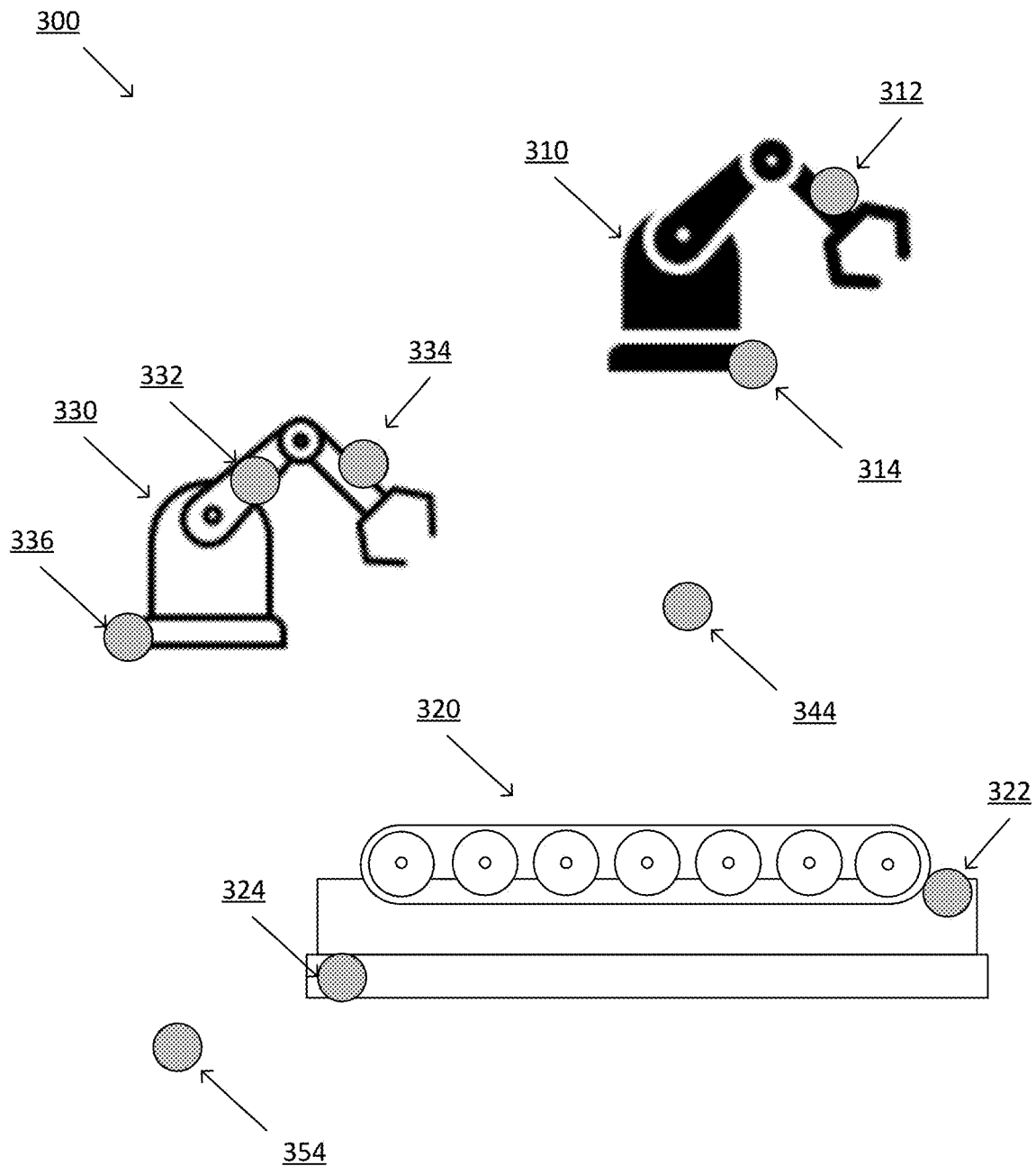
FIG. 4 is an illustration of an asset within an example environment, according to embodiments.

With reference to FIG. 4, an illustration of assets 310, 320, and 330 within an example environment 300 is shown, according to embodiments. As illustrated, environment 300 shows a floor of a manufacturing facility, with assets 310 and 330 illustrated as robotic arms, and asset 320 illustrated as a conveyer belt. Motion sensor 312 is positioned on one element of asset 310, motion sensor 314 is located on the stationary base of asset 310, motion sensor 322 is positioned adjacent to the conveyer belt of asset 320, motion sensor 324 is located on the stationary base of asset 320, motion sensor 332 is positioned on one element of asset 330, motion sensor 334 is positioned on another element of asset 330, and motion sensor 336 is located on the stationary base of asset 330. Motion sensors 344 and 354 that are placed within environment 300 may not be directly associated with any one asset, but may be used as a motion sensor for sensing environmental contributions. For example, motion sensors 344 and 354 may be placed on the ground somewhere within the manufacturing facility. It should be appreciated that motion sensors 314, 324, and 336, as well as motion sensors 344 and 354, can be used as a network of motion sensors for use in measuring the environmental affects across space of interest and enabling more precise interpolation of the environmental affects at the location where the asset is being monitored.

Figure 5:
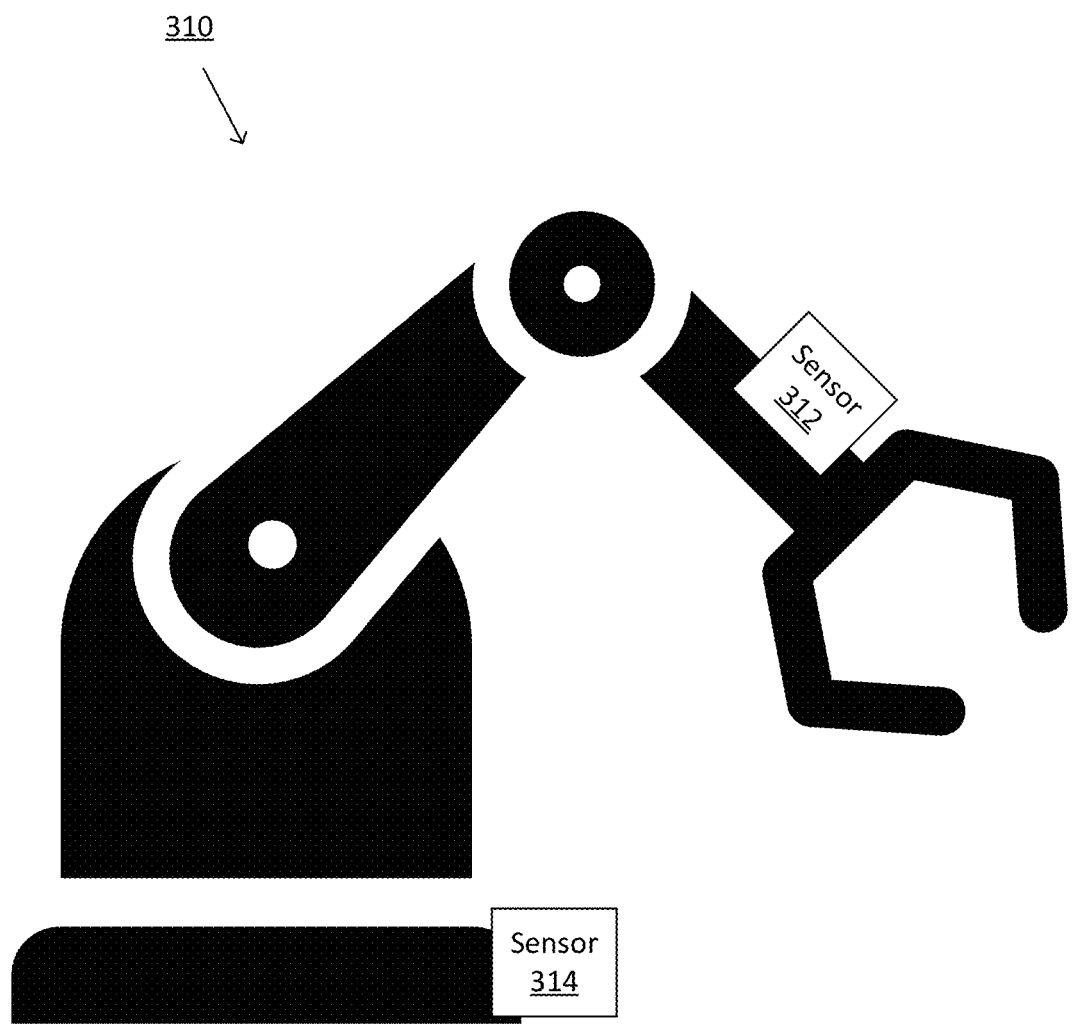
FIG. 5 is an illustration of an asset and motion sensors for monitoring the asset, according to embodiments.

FIG. 5 is an illustration of an asset 310 and motion sensors 312 and 314 for monitoring the asset, according to embodiments. It should be appreciated that the placement of the different sensors depends on the type of sensor and the source/feature used for the monitoring. As illustrated in FIG. 5, asset 310 is a robotic arm, where motion sensor 312 is positioned on an element of the robotic arm, and motion sensor 314 is located on the stationary base of asset 310.

In one example embodiment, motion sensors 312 and 314 measure the vibrations. These vibrations will include vibrations generated by asset 310 as well as vibrations generated by other sources of vibration within environment 300. The described embodiments use differential vibration sensing to determine the vibrations generated by asset 310, without any influence from any surrounding/environmental vibrations, by removing the vibrations not caused by asset 310. The described embodiments allow for subtraction of the environmental effects and allow more precise classification of the element being monitored.

The environmental vibration sensed by motion sensors 312 and 314 are not the same, due to being positioned at different locations or because the vibration may be damped through media of asset 310. Moreover, sensor orientation differences between motion sensors 312 and 314 (e.g., due to movement of asset 310) can result in the sensing of different motion. The described embodiments are applicable to situations where sensors 312 and 314 are moving or are not moving, and have the same or different orientation, by aligning the axes of motion sensors 312 and 314.

In some embodiments, the sensor orientation difference is overcome by projecting the orientation of motion sensor 312 onto the orientation of motion sensor 314 (where motion sensors 312 and 314 are 1-axis or 3-axis sensors) or by using the gravity vector (where motion sensors 312 and 314 are MEMS accelerometers). If 1-axis sensor is used, motion sensors 312 and 314 should not be orthogonal to each other. The sensor measurement from one sensor should be converted to the reference frame of the other sensor. The differential sensing is then done in the same reference frame. For example, earth frame or gravity frame, as understood by one of ordinary skill in the art of sensor orientation. For example, if the sensor data is represented by vector X in the orientation 1, it can be transformed to the orientation 2 by X'=R X, where R is the rotation matrix transforming coordinate system of orientation 1 to the coordinate system of orientation 2, and X' is the projection of X in the orientation 2. Converting axial measurement to magnitude can be also used to make it orientation agnostic.

The described embodiments distinguish vibration from asset 310 from the vibrations coming from the surrounding environment 300. In one embodiment, the vibration is distinguished by determining which of the vibrations (e.g., at a certain frequency) is higher. For instance, a vibration component would be considered to be from asset 310 if the vibration amplitude is higher for motion sensor 312 rather than motion sensor 314. In some embodiments, an amplitude of the vibration measurements of sensor 312 at a particular frequency and an amplitude of the vibration measurements of sensor 314 at the particular frequency are determined. The two amplitudes at the particular frequency are compared. The vibration contribution of asset 310 includes determining which of the amplitudes is greater, and provided the amplitude measured at motion sensor 312 is greater than the amplitude measured at motion sensor 314, it is determined that asset 310 is generating vibrations. Determining that asset 310 is generating vibrations allows for determining an operational condition of the asset, where the operational condition is indicative of performance of the asset that may be impacted by asset vibration contributions.

In another embodiment, the vibration generated by the asset (e.g., element of interest) is quantitatively determined and isolated from all vibrations. Vibrations measured at the asset motion sensor ($Sensor_{asset}$) and at the reference position motion sensor ($Sensor_{env}$) both measure vibrations from the asset and from the environment. For a given frequency f, consider $Sensor_{asset}$ and $Sensor_{env}$ sensor measurements as:

$$Sensor_{asset}(f)=A(f)*Asset(f)+B(f)*Env(f) \quad (1)$$

$$Sensor_{env}(f)=C(f)*Asset(f)+D(f)*Env(f) \quad (2)$$

where:

$Sensor_{asset}(f)$ is the vibration measured by the $Sensor_{asset}$ at frequency f;

Asset(f) is the true asset vibration at frequency f;

Env(f) is the true environment vibration at frequency f;

$Sensor_{env}(f)$ is the vibration measured by the $Sensor_{env}$ at frequency f; and A(f), B(f), C(f), and D(f) are sensing coefficients.

As shown in Equations 1 and 2, $Sensor_{asset}(f)$ and $Sensor_{env}(f)$ include contributions from both Asset(f) and Env(f). In some embodiments, the Asset(f) (e.g., the true element vibration contribution) is determined using the $Sensor_{asset}$(f), $Sensor_{env}$(f), and a plurality of sensing coefficients A(f), B(f), C(f), and D(f). In some embodiments, for simplicity, A(f)=D(f)=1. Therefore, there are two coefficients to be calibrated: B(f) and C(f).

In accordance with some embodiments, a plurality of sensing coefficients for $Sensor_{asset}$ and the $Sensor_{env}$ are determined during sensor calibration by receiving first calibration measurements from the $Sensor_{asset}$ and the $Sensor_{env}$ while the asset is not operational and only the environment is contributing vibrations and receiving second calibration measurements from the $Sensor_{asset}$ and the $Sensor_{env}$ while the asset operates and the environment contributes same vibrations as the first calibration measurements.

Continuing with the example of Equations 1 and 2, for instance, to calibrate and determine sensing coefficients B(f) and C(f), measurements are taken for both the $Sensor_{asset}$ and the $Sensor_{env}$ under two conditions:

1. the asset is not operating (or does not generate vibration at frequency f) and only environment has vibration at frequency f; and
2. the element operates and has vibration at frequency f with the same environment condition as the first condition.

Then:

$$B(f) = \frac{Sensor^1_{asset}(f)}{Sensor^1_{env}(f)} \quad (3)$$

$$C(f) = \frac{Sensor^2_{asset}(f) - Sensor^1_{asset}(f)}{Sensor^2_{env}(f) - Sensor^1_{env}(f)} \quad (4)$$

where:

$Sensor_{asset}^1(f)$ and $Sensor_{env}^1(f)$ are measurements at condition (1); and $Sensor_{asset}^2(f)$ and $Sensor_{env}^2(f)$ are measurements at condition (2).

It should be appreciated that in other embodiments, the sensing coefficients can be calculated by modeling (numerical simulation) or modal analysis.

During operation of $Sensor_{asset}$ and the $Sensor_{env}$, where A(f) and D(f) are one, B(f) and C(f) are sensing coefficients determined during calibration, there are two measurements ($Sensor_{asset}(f)$ and $Sensor_{env}(f)$) and two equations. Accordingly, Asset(f) and Env(f) can be directly determined. Determining and monitoring Asset(f) allows for determining an operational condition of the asset, where the operational condition is indicative of asset performance that may be impacted by asset vibration contributions.

The described embodiments are helpful when there are similar vibration components existing in the environment and the asset. The described embodiments can be used for the raw vibration sensing data or a set of features derived from the sensing data. In some embodiments, it may be useful to model attenuation of vibration over space between the differential sensors.

In another embodiment, it may be desirable to deploy a network of synchronized sensors in the space to more precisely measure the environmental vibration contribution and develop a more accurate attenuation map using the network of motion sensors and their locations with respect to the location of element being monitored (e.g., using triangulation techniques).

The time synchronization will also enable buffering and sending accurately time tagged data in batches from each node thereby elevating hard real-time requirement at the system level. The data batches can be shared with processor engine at irregular times with uncontrolled latency. Accurately time tagged data may be raw vibration sensing data, set of features derived from the data, or events detected.

The described embodiments provide a CBM system including a plurality of motion sensors. Monitoring the device vibrations allows for the detection of changes in vibrational magnitude and/or frequency that are indicative of a change in the operational condition of the device. For example, detecting a vibrational frequency above a threshold frequency may indicate a degradation in performance of the device. A notification can be generated responsive to detecting such a change, notifying an individual responsible for managing device operations and repairs that the particular device should be investigated for potential repair.

Figure 6A:
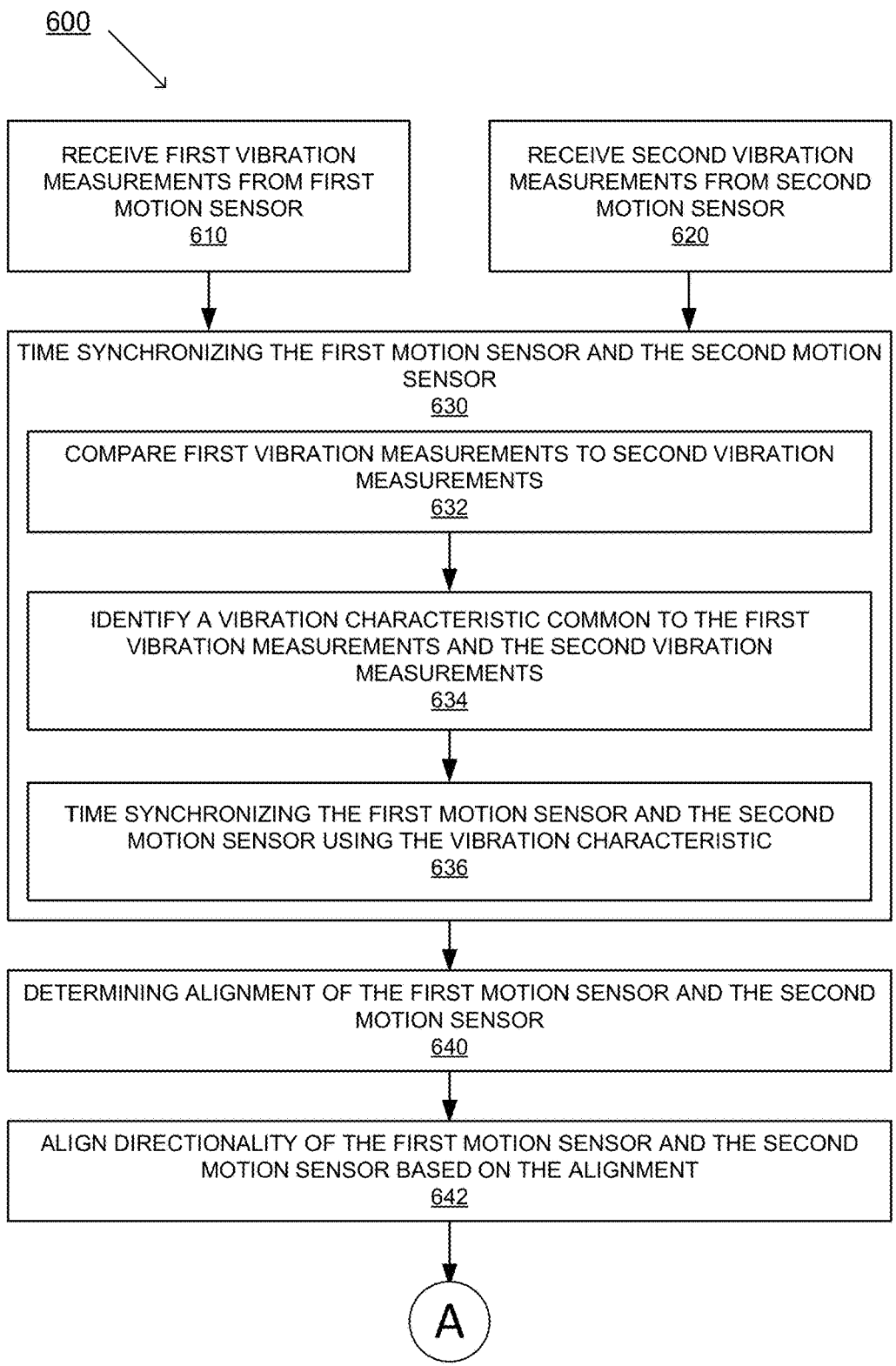
FIGS. 6A and 6B illustrate flow diagrams of example methods for determining vibrations generated by a device, according to various embodiments.
Figure 6B:
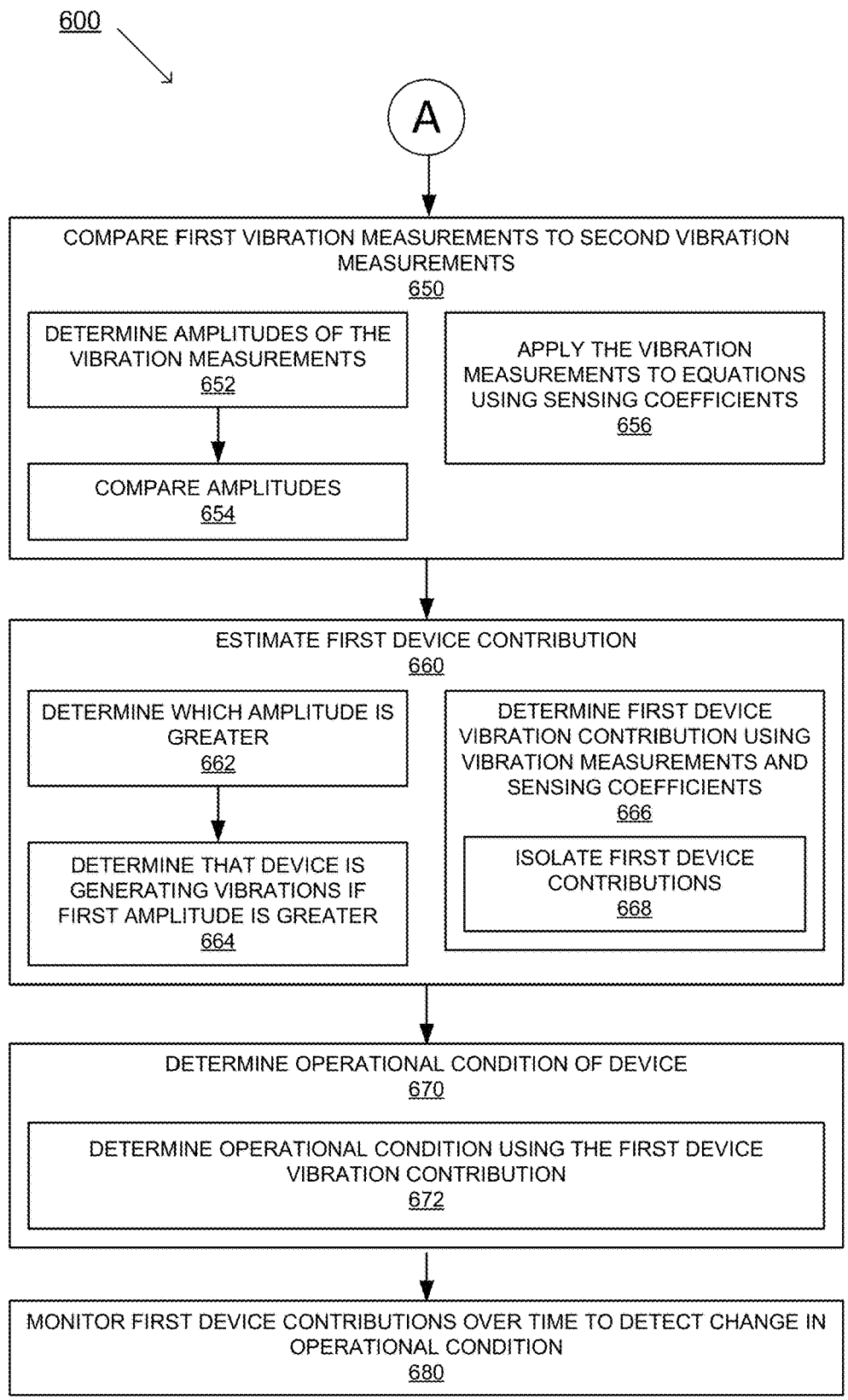

Example Operations for Operating a System for Determining Vibrations Generated by a Device FIGS. 6A and 6B illustrate flow diagrams of example methods for determining vibrations generated by a device, according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG. 6A, flow diagram 600 illustrates an example process for determining vibrations generated by a device, according to some embodiments. At procedure 610 of flow diagram 600, first vibration measurements are received from a first motion sensor (e.g., accelerometer) coupled to the device, the first vibration measurements comprising a first device vibration contribution and a first environmental vibration contribution, wherein the device is located within an environment comprising a plurality of devices capable of generating vibrations. At procedure 620, second vibration measurements are received from a second motion sensor (e.g., accelerometer) located within the environment and not connected to the device, the second vibration measurements comprising a second device vibration contribution and a second environmental vibration contribution. In some embodiments, the first motion sensor and the second motion sensor are maintained in a low power standby mode when the device is not operational.

In some embodiments, as shown at procedure 630, the first motion sensor and the second motion sensor are time synchronized. In some embodiments, as shown at procedure 632, the first vibration measurements and the second vibration measurements are compared. At procedure 634, a vibration characteristic present in both the first vibration measurements and the second vibration measurements is identified. At procedure 636, the first motion sensor and the second motion sensor are time synchronized using the vibration characteristic.

In some embodiments, as shown at procedure 640, alignment of the first motion sensor and the second motion sensor is determined. In some embodiments, as shown at procedure 642, the directionality of vibration of the first motion sensor and the second motion sensor is aligned based on the alignment With reference to FIG. 6B, at procedure 650, the first vibration measurements and the second vibration measurements are compared. In some embodiments, as shown at procedure 652, a first amplitude of the first vibration measurements at a particular frequency and a second amplitude of the second vibration measurements at the particular frequency are determined. At procedure 654, the first amplitude at the particular frequency is compared to the second amplitude at the particular frequency. In another embodiment, as shown at procedure 656, the first vibration measurements and the second vibration measurements are applied to equations using sensing coefficients.

At procedure 660, based on the comparing, the first device vibration contribution is estimated. In one embodiment, as shown at procedure 662, which of the first amplitude and the second amplitude is greater is determined. At procedure 664, provided the first amplitude is greater than the second amplitude, it is determined that the device is generating vibrations. In another embodiment, as shown at procedure 666, the first device vibration contribution is determined using the first vibration measurements, the second vibration measurements, and a plurality of sensing coefficients for the first motion sensor and the second motion sensor. In some embodiments, as shown at procedure 668, the first device vibration contribution is isolated from the first vibration measurements and the second vibration measurements, wherein the first device vibration contribution comprises a first sensing coefficient multiplied by the actual device vibration contribution, the first environmental vibration contribution comprises a second sensing coefficient multiplied by the actual environmental vibration contribution, the second device vibration contribution comprises a third sensing coefficient multiplied by the actual device vibration contribution, and second environmental vibration contribution comprises a fourth sensing coefficient multiplied by the actual environmental vibration contribution.

At procedure 670, an operational condition of the device is determined based on the estimating, wherein the operational condition is indicative of device performance that may be impacted by device vibration contributions. In some embodiments, as shown at procedure 672, the operational condition of the device is determined using the first device vibration contribution. In some embodiments, as shown at procedure 680, first device vibration contributions are monitored over time to detect a change in the operational condition of the device.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for determining vibrations generated by a device, the method comprising:
   receiving first vibration measurements from a first accelerometer coupled to the device, the first vibration measurements comprising a first device vibration contribution and a first environmental vibration contribution, wherein the device is located within an environment comprising a plurality of devices capable of generating vibrations;
   receiving second vibration measurements from a second accelerometer located within the environment and not connected to the device, the second vibration measurements comprising a second device vibration contribution and a second environmental vibration contribution;
   comparing the first vibration measurements and the second vibration measurements;
   based on the comparing, estimating the first device vibration contribution; and
   determining an operational condition of the device based on the estimating, wherein the operational condition is indicative of device performance that may be impacted by device vibration contributions.

2. The method of claim 1, wherein the comparing the first vibration measurements and the second vibration measurements comprises:
   determining a first amplitude of the first vibration measurements at a particular frequency and a second amplitude of the second vibration measurements at the particular frequency; and
   comparing the first amplitude at the particular frequency to the second amplitude at the particular frequency.

3. The method of claim 2, wherein the estimating the first device vibration contribution comprises:
   determining which of the first amplitude and the second amplitude is greater; and
   provided the first amplitude is greater than the second amplitude, determining that the device is generating vibrations.

4. The method of claim 1, wherein the estimating the first device vibration contribution comprises:
   determining the first device vibration contribution using the first vibration measurements, the second vibration measurements, and a plurality of sensing coefficients for the first accelerometer and the second accelerometer.

5. The method of claim 4, further comprising:
   determining the plurality of sensing coefficients for the first accelerometer and the second accelerometer by:
      receiving first calibration measurements from the first accelerometer and the second accelerometer while the device is not operational and only the environment is contributing vibrations; and
      receiving second calibration measurements from the first accelerometer and the second accelerometer while the device operates and the environment contributes same vibrations as the first calibration measurements.

6. The method of claim 4, wherein the determining the first device vibration contribution comprises:
   isolating the first device vibration contribution from the first vibration measurements and the second vibration measurements, wherein the first device vibration contribution comprises a first sensing coefficient multiplied by the actual device vibration contribution, the first environmental vibration contribution comprises a second sensing coefficient multiplied by the actual environmental vibration contribution, the second device vibration contribution comprises a third sensing coefficient multiplied by the actual device vibration contribution, and second environmental vibration contribution comprises a fourth sensing coefficient multiplied by the actual environmental vibration contribution.

7. The method of claim 4, wherein the determining the operational condition of the device based on the comparing comprises:
   determining the operational condition of the device using the first device vibration contribution.

8. The method of claim 1, further comprising:
   determining alignment of the first accelerometer and the second accelerometer; and
   aligning directionality of vibration of the first accelerometer and the second accelerometer based on the alignment.

9. The method of claim 1, further comprising:
   time synchronizing the first accelerometer and the second accelerometer.

10. The method of claim 9, wherein the time synchronizing the first accelerometer and the second accelerometer comprises:
    comparing the first vibration measurements and the second vibration measurements;
    identifying a vibration characteristic present in both the first vibration measurements and the second vibration measurements; and
    time synchronizing the first accelerometer and the second accelerometer using the vibration characteristic.

11. The method of claim 1, further comprising:
    maintaining the first accelerometer and the second accelerometer in a low power standby mode when the device is not operational.

12. The method of claim 1, further comprising:
    monitoring first device vibration contributions over time to detect a change in the operational condition of the device.

13. The method of claim 1, further comprising:
    receiving third vibration measurements from a third accelerometer located within the environment, such that the third vibration measurements are used to measure environmental vibrations for use in determining the operational condition of the device.

14. A system for determining vibrations generated by a device, the system comprising:
    a first accelerometer coupled to the device, the first accelerometer configured to sense first vibration measurements, the first vibration measurements comprising a first device vibration contribution and a first environmental vibration contribution, wherein the device is located within an environment comprising a plurality of devices capable of generating vibrations;
    a second accelerometer located within the environment and not connected to the device configured to sense second vibration measurements, the second vibration measurements comprising a second device vibration contribution and a second environmental vibration contribution; and a computer system comprising a memory device and a processor, the processor configured to:
receive the first vibration measurements from the first accelerometer;
receive the second vibration measurements from the second accelerometer;
compare the first vibration measurements and the second vibration measurements;
estimate the first device vibration contribution based on the compare; and
determine an operational condition of the device based on the estimate of the first device vibration contribution, wherein the operational condition is indicative of device performance that may be impacted by device vibration contributions.

15. The system of claim 14, wherein the processor is further configured to:
determine a first amplitude of the first vibration measurements at a particular frequency and a second amplitude of the second vibration measurements at the particular frequency; and
compare the first amplitude at the particular frequency to the second amplitude at the particular frequency.

16. The system of claim 15, wherein the processor is further configured to:
determine which of the first amplitude and the second amplitude is greater; and
determine that the device is generating vibrations provided the first amplitude is greater than the second amplitude.

17. The system of claim 14, wherein the processor is further configured to:
determine the first device vibration contribution using the first vibration measurements, the second vibration measurements, and a plurality of sensing coefficients for the first accelerometer and the second accelerometer.

18. The system of claim 17, wherein the processor is further configured to:
determine the plurality of sensing coefficients for the first accelerometer and the second accelerometer by:
receiving first calibration measurements from the first accelerometer and the second accelerometer while the device is not operational and only the environment is contributing vibrations; and
receiving second calibration measurements from the first accelerometer and the second accelerometer while the device operates and the environment contributes same vibrations as the first calibration measurements.

19. The system of claim 17, wherein the processor is further configured to:
isolate the first device vibration contribution from the first vibration measurements and the second vibration measurements, wherein the first device vibration contribution comprises a first sensing coefficient multiplied by the actual device vibration contribution, the first environmental vibration contribution comprises a second sensing coefficient multiplied by the actual environmental vibration contribution, the second device vibration contribution comprises a third sensing coefficient multiplied by the actual device vibration contribution, and second environmental vibration contribution comprises a fourth sensing coefficient multiplied by the actual environmental vibration contribution; and
determine the operational condition of the device using the first device vibration contribution.

20. A non-transitory computer readable storage medium having computer readable program code stored thereon for causing a computer system to perform a method for determining vibrations generated by a device, the method comprising:
receiving first vibration measurements from a first accelerometer coupled to the device, the first vibration measurements comprising a first device vibration contribution and a first environmental vibration contribution, wherein the device is located within an environment comprising a plurality of devices capable of generating vibrations;
receiving second vibration measurements from a second accelerometer located within the environment and not connected to the device, the second vibration measurements comprising a second device vibration contribution and a second environmental vibration contribution;
comparing the first vibration measurements and the second vibration measurements;
based on the comparing, estimating the first device vibration contribution; and
determining an operational condition of the device based on the estimating, wherein the operational condition is indicative of device performance that may be impacted by device vibration contributions.

\* \* \* \* \*